(12) United States Patent
Nakamura et al.

(10) Patent No.: US 12,467,739 B2
(45) Date of Patent: Nov. 11, 2025

(54) HEIGHT MEASUREMENT APPARATUS AND HEIGHT MEASUREMENT METHOD (71) Applicant: HAMAMATSU PHOTONICS K.K., Hamamatsu (JP)

(72) Inventors: Tomonori Nakamura, Hamamatsu (JP); Kunihiko Tsuchiya, Hamamatsu (JP)

(73) Assignee: HAMAMATSU PHOTONICS K.K., Shizuoka (JP)

(*) Notice: Subject to any disclaimer, the term of this patent is extended or adjusted under 35 U.S.C. 154(b) by 0 days.

(21) Appl. No.: 17/797,179

(22) PCT Filed: Feb. 2, 2021

(86) PCT No.: PCT/JP2021/003768
§ 371 (c)(1),
(2) Date: Aug. 3, 2022

(87) PCT Pub. No.: WO2021/161854
PCT Pub. Date: Aug. 19, 2021

(65) Prior Publication Data
US 2023/0066638 A1 Mar. 2, 2023

(30) Foreign Application Priority Data

Feb. 13, 2020 (JP) .................. 2020-022724

(51) Int. Cl.
G01B 11/06 (2006.01)
G01B 15/02 (2006.01)
(Continued)

(52) U.S. Cl.
CPC .......... *G01B 11/06* (2013.01); *G01B 11/0608* (2013.01); *G01B 11/0633* (2013.01);
(Continued)

(58) Field of Classification Search
CPC . G01B 11/06; G01B 11/0608; G01B 11/0633; G01B 11/0691; G01B 15/02; G02B 27/141
See application file for complete search history.

(56) References Cited

U.S. PATENT DOCUMENTS 5,726,756 A    3/1998  Aki et al.
7,061,601 B2   6/2006  Meeks
(Continued)

FOREIGN PATENT DOCUMENTS

CN    201993103 U    9/2011
CN    102252762 A    11/2011
(Continued)

OTHER PUBLICATIONS

International Preliminary Report on Patentability mailed Aug. 25, 2022 for PCT/JP2021/003768.
(Continued)

*Primary Examiner* — Uzma Alam
*Assistant Examiner* — Justin J Van Cleave
(74) *Attorney, Agent, or Firm* — Faegre Drinker Biddle & Reath LLP (57) ABSTRACT A height measurement apparatus includes: a light irradiation unit that irradiates a sample with irradiation light; a camera system that detects light from the sample irradiated with the irradiation light; and a control apparatus that calculates a height of the sample based on the wavelength information. The camera system includes an inclined dichroic mirror of which a transmittance and a reflectance change according to a wavelength in a predetermined wavelength range and which separates the light from the sample by transmitting and reflecting the light, a light detector that detects a reflected light quantity from light reflected by the inclined dichroic mirror, a light detector that detects a transmitted
(Continued)

light quantity from light transmitted through the inclined dichroic mirror, and a processing unit that calculates the wavelength information based on a ratio between the reflected light quantity and the transmitted light quantity, to output the wavelength information.

8 Claims, 6 Drawing Sheets

(51) Int. Cl.
  *G01J 3/02* (2006.01)
  *G01J 9/00* (2006.01)
  *G02B 27/14* (2006.01)
(52) U.S. Cl.
  CPC .......... *G01B 11/0691* (2013.01); *G01B 15/02* (2013.01); *G01J 3/027* (2013.01); *G01J 9/00* (2013.01); *G02B 27/141* (2013.01)

(56) References Cited

U.S. PATENT DOCUMENTS

| | | | |
|---|---|---|---|
| 9,587,930 | B2 | 3/2017 | Srocka |
| 10,499,662 | B1 * | 12/2019 | Kristensen ......... G01B 11/0608 |
| 2002/0127950 | A1 | 9/2002 | Hirose et al. |
| 2005/0094160 | A1 | 5/2005 | Murai et al. |
| 2006/0126170 | A1 | 6/2006 | Yamashita et al. |
| 2008/0068722 | A1 | 3/2008 | Chow |
| 2009/0316258 | A1 | 12/2009 | Uhl |
| 2010/0183188 | A1 | 7/2010 | Straehle et al. |
| 2012/0097864 | A1 * | 4/2012 | Takahashi .......... G01N 21/6452 250/208.1 |
| 2014/0355006 | A1 | 12/2014 | Hotta |
| 2015/0350588 | A1 | 12/2015 | Lim et al. |
| 2016/0103311 | A1 | 4/2016 | Ito et al. |
| 2018/0038682 | A1 | 2/2018 | Smith et al. |
| 2019/0250078 | A1 | 8/2019 | Braun et al. |

FOREIGN PATENT DOCUMENTS

| | | | | |
|---|---|---|---|---|
| CN | 102564588 | A | | 7/2012 |
| CN | 103558221 | A | | 2/2014 |
| CN | 103620340 | A | | 3/2014 |
| CN | 104880258 | A | | 9/2015 |
| CN | 105278228 | A | | 1/2016 |
| CN | 106052871 | A | | 10/2016 |
| CN | 107110640 | A | | 8/2017 |
| CN | 107407748 | A | | 11/2017 |
| CN | 110381230 | A | | 10/2019 |
| CN | 110487192 | A * | 11/2019 | ............. G01B 11/06 |
| CN | 110500963 | A | | 11/2019 |
| DE | 102015218720 | A1 | | 9/2016 |
| EP | 2076733 | B1 | | 12/2012 |
| JP | H07-027520 | A | | 1/1995 |
| JP | H10-047926 | A | | 2/1998 |
| JP | 2001-108420 | A | | 4/2001 |
| JP | 2002-196223 | A | | 7/2002 |
| JP | 2003014422 | A * | 1/2003 | |
| JP | 2004-069651 | A | | 3/2004 |
| JP | 2006-276840 | A | | 10/2006 |
| JP | 2007101399 | A * | 4/2007 | |
| JP | 2008039750 | A * | 2/2008 | |
| JP | 2008-175742 | A | | 7/2008 |
| JP | 2008-292240 | A | | 12/2008 |
| JP | 2009-145279 | A | | 7/2009 |
| JP | 2009-287979 | A | | 12/2009 |
| JP | 2010-025671 | A | | 2/2010 |
| JP | 2011-027706 | A | | 2/2011 |
| JP | 2011039005 | A * | 2/2011 | ............. G01B 11/25 |
| JP | 2011-226876 | A | | 11/2011 |
| JP | 2012-137394 | A | | 7/2012 |
| JP | 2014-235332 | A | | 12/2014 |
| JP | 2014-235333 | A | | 12/2014 |
| JP | 2015-211727 | A | | 11/2015 |
| JP | 2016-031444 | A | | 3/2016 |
| JP | 2017-009523 | A | | 1/2017 |
| JP | 2017015526 | A | | 1/2017 |
| JP | 2017-078724 | A | | 4/2017 |
| JP | 2017-137394 | A | | 8/2017 |
| JP | 6285597 | B1 | | 2/2018 |
| JP | 2018-116032 | A | | 7/2018 |
| JP | 2018-205132 | A | | 12/2018 |
| JP | 2019-144217 | A | | 8/2019 |
| KR | 20120081024 | A | | 7/2012 |
| KR | 20130018164 | A | | 2/2013 |
| KR | 20190027333 | A | | 3/2019 |
| TW | 200601267 | A | | 1/2006 |
| TW | 201015046 | A | | 4/2010 |
| TW | 201122415 | A | | 7/2011 |
| WO | WO-01/001070 | A1 | | 1/2001 |
| WO | WO-2009/153067 | A2 | | 12/2009 |
| WO | 2016/193037 | A1 | | 12/2016 |
| WO | WO-2018/072447 | A1 | | 4/2018 |

OTHER PUBLICATIONS

International Preliminary Report on Patentability mailed Aug. 25, 2022 for PCT/JP2021/000041.
International Preliminary Report on Patentability mailed Aug. 25, 2022 for PCT/JP2021/004743.
Office Action issued Mar. 19, 2025 in related U.S. Appl. No. 17/797,193.
Office Action issued on May 27, 2025 in corresponding EP patent application 21753865.1 (6 pages).
U.S. Final Office Action issued Oct. 28, 2024 in U.S. Appl. No. 17/797,193.
Office Action issued Feb. 25, 2025 in related U.S. Appl. No. 17/797,206.
Notice of Allowance dated Sep. 3, 2025 issued in U.S. Appl. No. 17/797,193.

* cited by examiner

HEIGHT MEASUREMENT APPARATUS AND HEIGHT MEASUREMENT METHOD

TECHNICAL FIELD

One aspect of the present invention relates to a height measurement apparatus and a height measurement method.

BACKGROUND ART

As a method for measuring a height of a measurement object, a method for measuring a height by irradiating the measurement object with light and by detecting light from the measurement object has been known (for example, refer to Patent Literatures 1 to 3). In the height measurement method disclosed in Patent Literatures 1 to 3, a measurement object is irradiated with irradiation light including a plurality of light fluxes arranged in a direction intersecting an optical axis direction and having different wavelengths, at an angle inclined with respect to a height direction of the measurement object, and a height of the measurement object is measured based on a wavelength of reflected light from the measurement object.

CITATION LIST

Patent Literature

Patent Literature 1: Japanese Unexamined Patent Publication No. H7-27520
Patent Literature 2: Japanese Unexamined Patent Publication No. 2007-101399
Patent Literature 3: Japanese Unexamined Patent Publication No. 2009-145279

SUMMARY OF INVENTION

Technical Problem

Here, in the above-described height measurement method, the wavelength of the light from the measurement object is obtained by a color imaging element. When the wavelength of the light is obtained in such a manner, since the derivation of the wavelength of the light is affected by a color of the measurement object itself, the accuracy of a final height measurement result of the measurement object decreases, which is a concern.

One aspect of the present invention is conceived in view of the above circumstances, and an object of the present invention is to provide a height measurement apparatus and a height measurement method capable of measuring a height of a measurement object with higher accuracy.

Solution to Problem

A height measurement apparatus according to one aspect of the present invention includes: a light irradiation unit that irradiates a measurement object with irradiation light including a plurality of light fluxes arranged in a direction intersecting an optical axis direction and having different wavelengths, at an angle inclined with respect to a height direction of the measurement object; a light detection unit that detects light from the measurement object irradiated with the irradiation light, to output wavelength information of the light; and an analysis unit that calculates a height of the measurement object based on the wavelength information. The light detection unit includes an optical element of which a transmittance and a reflectance change according to a wavelength in a predetermined wavelength range and which separates the light from the measurement object by transmitting and reflecting the light, a first light detector that detects a reflected light quantity from light reflected by the optical element, a second light detector that detects a transmitted light quantity from light transmitted through the optical element, and a processing unit that calculates the wavelength information based on a ratio between the reflected light quantity and the transmitted light quantity, to output the wavelength information.

In the height measurement apparatus according to one aspect of the present invention, the measurement object is irradiated with the irradiation light including the plurality of light fluxes arranged in the direction intersecting the optical axis direction and having different wavelengths, at an angle inclined with respect to the height direction of the measurement object, wavelength information is derived based on light from the measurement object and is output, and a height of the measurement object is calculated based on the wavelength information. As described above, since the measurement object is obliquely (at an inclined angle) irradiated with the irradiation light including the plurality of different light fluxes, in the direction intersecting the optical axis direction, the wavelength of the light with which the measurement object is irradiated changes depending on the height of the measurement object. Therefore, when the light from the measurement object is detected and the wavelength information is derived, the height of the measurement object can be appropriately calculated based on the wavelength information. Here, in the height measurement apparatus according to one aspect of the present invention, the light is separated by the optical element of which the transmittance and the reflectance change according to the wavelength, the reflected light quantity is detected from the light reflected by the optical element, the transmitted light quantity is detected from the light transmitted through the optical element, and the wavelength information is calculated based on the ratio between the reflected light quantity and the transmitted light quantity. For example, when a wavelength of light from a measurement object is derived based on the intensity of light acquired by a color imaging element, since the intensity of light acquired by the color imaging element changes due to being affected by a color of the measurement object itself, the calculation accuracy of wavelength information of the light cannot be guaranteed, which is a concern. In this case, the height measurement accuracy of the measurement object based on the wavelength information also decreases. In this regard, in the height measurement apparatus according to one aspect of the present invention, as described above, since the light is separated by the optical element of which the transmittance and the reflectance change according to the wavelength, and the wavelength information is calculated based on the ratio between the reflected light quantity and the transmitted light quantity that are separated, the wavelength information of the light can be calculated with high accuracy without being affected by a color of the measurement object itself. According to the height measurement apparatus, the height of the measurement object can be calculated with high accuracy based on the wavelength information of the light calculated with high accuracy.

In the height measurement apparatus, the first light detector and the second light detector may be line sensors. Since the line sensors are used, for example, imaging is performed on each imaging line with high accuracy while changing the imaging line by moving the measurement object. Accordingly, the height of the measurement object can be calculated with higher accuracy.

In the height measurement apparatus, the light irradiation unit may irradiate the measurement object with the irradiation light including the plurality of light fluxes that are parallel light. Since the measurement object is irradiated with parallel light, a correspondence between the wavelength and the height can be easily and appropriately derived, and the height of the measurement object can be calculated with higher accuracy.

In the height measurement apparatus, the light irradiation unit may include a light source that emits white light, and a spectral element that splits the white light output from the light source, to output the irradiation light including the plurality of light fluxes having different wavelengths, in the direction intersecting the optical axis direction. As described above, the irradiation light including the plurality of light fluxes having different wavelengths can be easily and appropriately output by splitting the white light including all visible rays and by outputting each light flux.

The height measurement apparatus may further include a dark box that blocks light other than the light with which the measurement object is irradiated by the light irradiation unit, as light with which the measurement object is to be irradiated. According to such a configuration, the height of the measurement object can be calculated with higher accuracy by blocking the light that is not related to the height measurement.

The height measurement apparatus may further include a conveyor unit that moves the measurement object. According to such a configuration, the height of the entire measurement object can be measured by deriving wavelength information of the entire measurement object while changing an irradiation point of the irradiation light on the measurement object.

A height measurement method according to one aspect of the present invention includes: a light irradiation step of irradiating a measurement object with irradiation light including a plurality of light fluxes arranged in a direction intersecting an optical axis direction and having different wavelengths, at an angle inclined with respect to a height direction of the measurement object; a wavelength calculation step of calculating wavelength information of light from the measurement object based on a ratio between a reflected light quantity and a transmitted light quantity obtained by an optical element of which a transmittance and a reflectance change according to a wavelength in a predetermined wavelength range and which separates the light from the measurement object by transmitting and reflecting the light, by a first light detector that detects the reflected light quantity from light reflected by the optical element, and by a second light detector that detects the transmitted light quantity from light transmitted through the optical element; and a height calculation step of calculating a height of the measurement object based on the wavelength information. According to such a height measurement method, the height of the measurement object can be calculated with high accuracy based on the wavelength information of the light calculated with high accuracy.

In the height measurement method, in the light irradiation step, an irradiation point of the irradiation light on the measurement object may be continuously changed by moving the measurement object, and in the height calculation step, a shape of the measurement object may be derived by calculating a height corresponding to the each irradiation point on the measurement object. In such a height measurement method, the irradiation point of the irradiation light on the measurement object is continuously changed to measure the height of the entire measurement object, and the shape of the measurement object can be appropriately derived based on a result of the height measurement.

Advantageous Effects of Invention

In the height measurement apparatus according to one aspect of the present invention, the height of the measurement object can be measured with higher accuracy.

DESCRIPTION OF EMBODIMENTS

Hereinafter, an embodiment of the present invention will be described in detail with reference to the drawings. Incidentally, in the drawings, the same or corresponding portions are denoted by the same reference signs, and a duplicated description will be omitted.

Figure 1:
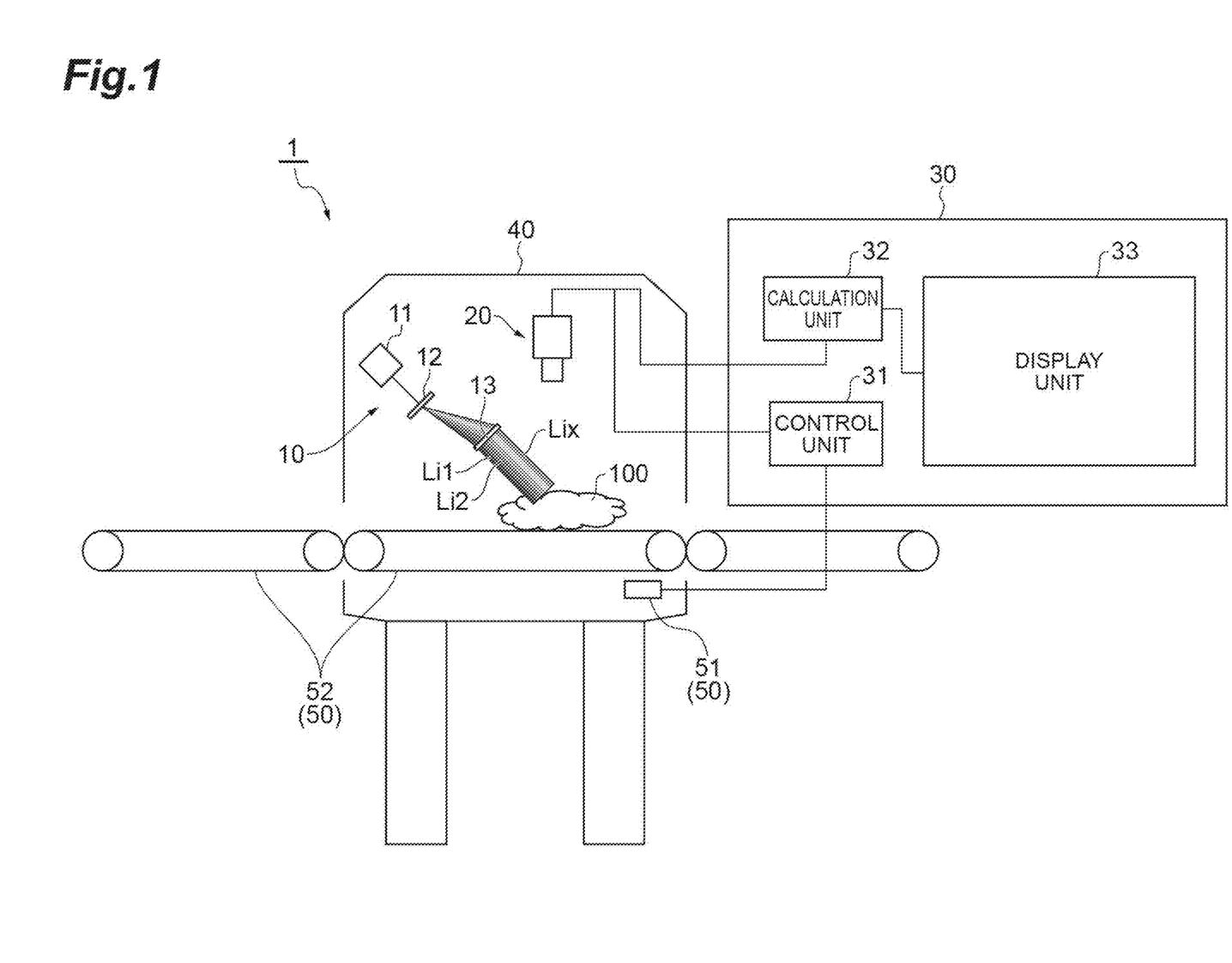
FIG. 1 is a view schematically illustrating a height measurement apparatus according to the present embodiment.

FIG. 1 is a view schematically illustrating a height measurement apparatus 1 according to the present embodiment. The height measurement apparatus 1 is an apparatus that irradiates a sample 100 with light to measure a height of the sample 100 based on reflected light from the sample 100. The height measurement apparatus 1 may calculate a height of each region of the sample 100 by continuously changing an irradiation point of the light on the sample 100, and finally derive a shape of the sample 100 based on the height of each region. The sample 100 may be any object of which a height is desired to be measured and is, for example, food, various processed products, or the like.

Figure 2:
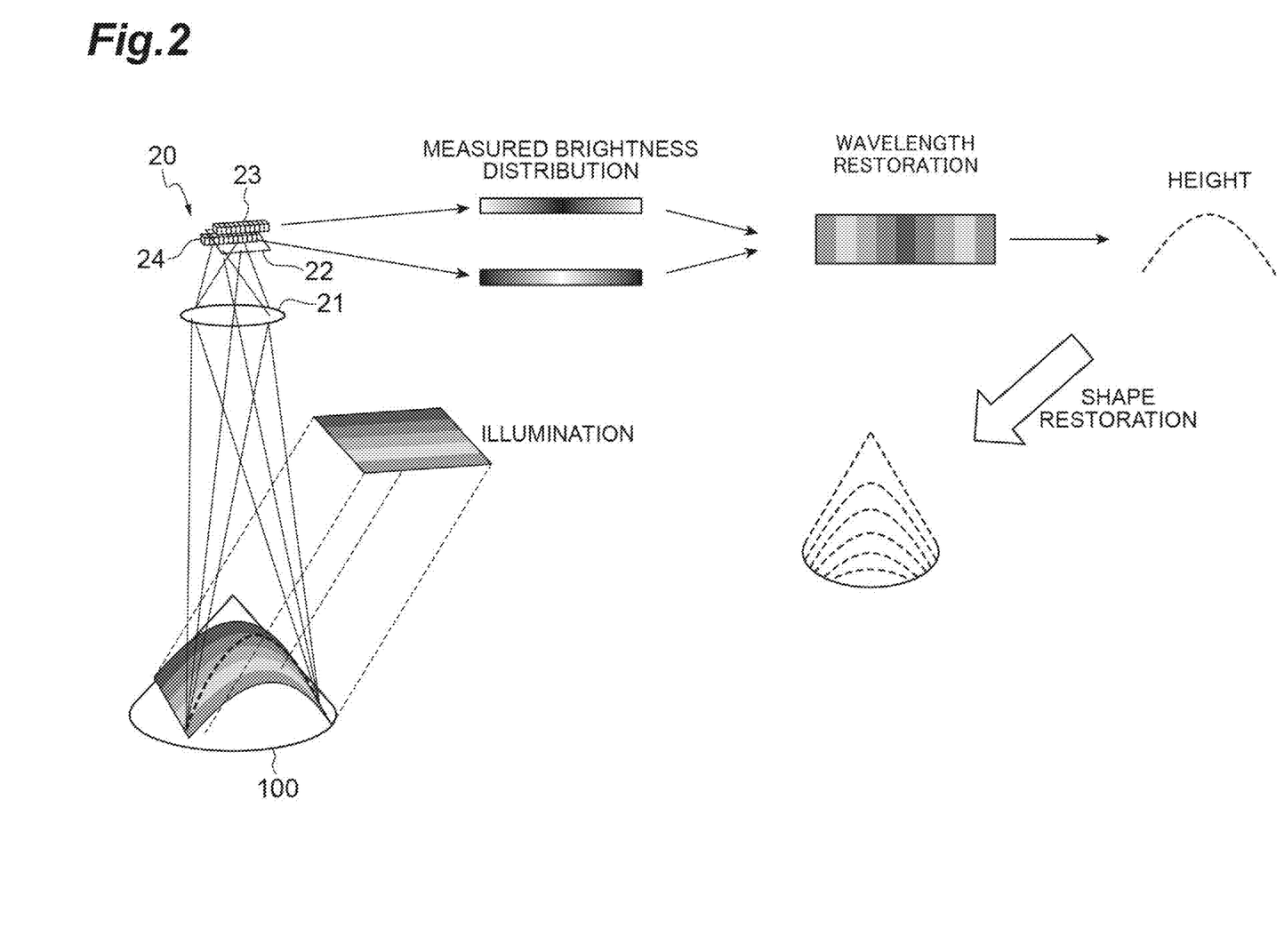
FIG. 2 is a view describing a height measurement and shape estimation process of a measurement object.

FIG. 2 is a view describing a height measurement and shape estimation process of the sample 100. In a height measurement method and a shape estimation method performed by the height measurement apparatus 1 according to the present embodiment, as illustrated in FIG. 2, the sample 100 is obliquely irradiated with light including a plurality of wavelengths, reflected light from the sample 100 passes through a lens 21 (to be described later) and is separated by an inclined dichroic mirror 22 (to be described later), the separated light is detected by light detectors 23 and 24 (to be described later) that are line sensors or the like, wavelength information of light at each irradiation point is restored based on a distribution of the brightness (light quantity) of the light detected by each of the light detectors 23 and 24, a height at each irradiation point is calculated based on the wavelength information, and the shape of the sample 100 is restored based on the height of each irradiation point. Details will be described later.

As illustrated in FIG. 1, the height measurement apparatus 1 includes a light irradiation unit 10, a camera system 20

(light detection unit), a control apparatus 30 (analysis unit), a dark box 40, and a belt conveyor 50 (conveyor unit).

The belt conveyor 50 is a conveyor unit that moves the sample 100. The belt conveyor 50 moves the sample 100 in one direction of a horizontal direction to change the irradiation point of irradiation light (irradiation light emitted from the light irradiation unit 10) on the sample 100. The belt conveyor 50 includes a belt unit 52 on which the sample 100 is placed and which moves in the one direction, and an actuator 51 that operates the belt unit 52. The actuator 51 is controlled by a control unit 31 (to be described later) of the control apparatus 30.

The dark box 40 accommodates at least the light irradiation unit 10, the camera system 20, and a part of the belt conveyor 50 (in detail, a point at which the sample 100 placed on the belt conveyor 50 is irradiated with the irradiation light from the light irradiation unit 10) among the above-described configurations of the height measurement apparatus 1, and is provided to avoid the influence of external light on the accommodated configurations. The dark box 40 blocks light other than the light emitted from the light irradiation unit 10 as light with which the sample 100 is to be irradiated.

The light irradiation unit 10 irradiates the sample 100 with irradiation light including a plurality of light fluxes arranged in a direction intersecting an optical axis direction and having different wavelengths, at an angle inclined with respect to a height direction of the sample 100 (measurement object). In the irradiation light emitted from the light irradiation unit 10 to the sample 100, as illustrated in FIG. 1, flat light fluxes Li1, Li2, . . . LiX (X is an integer) having different wavelengths are arranged along the direction intersecting the optical axis direction without a gap therebetween. The angle inclined with respect to the height direction of the sample 100 is an angle other than a vertical direction and in more detail, is an angle (angle in an oblique direction) other than the vertical direction and the horizontal direction. When the sample 100 is irradiated with such irradiation light, one point on the sample 100 is irradiated with a light flux (only one of the flat light fluxes Li1, Li2, . . . LiX) of a color differing depending on the height. For this reason, a height at an irradiation point of the sample 100 can be derived by observing light reflected from the sample 100. The light irradiation unit 10 irradiates the sample 100 with the irradiation light including the plurality of light fluxes that are parallel light. The light irradiation unit 10 includes, for example, a light source 11 and spectral elements 12 and 13. As described above, the light irradiation unit 10 includes two spectral elements 12 and 13 as elements related to light spectroscopy.

Figure 5:
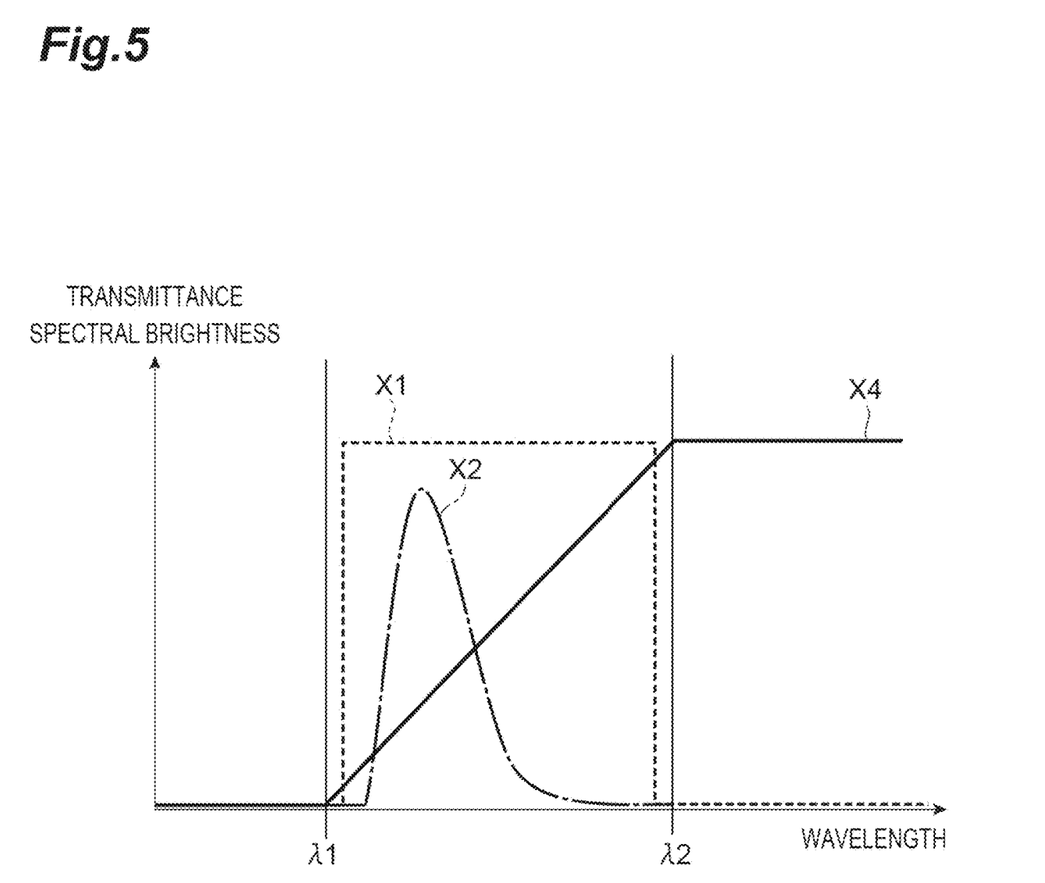
FIG. 5 is a graph describing a spectrum of light and a characteristic of an inclined dichroic mirror.

The light source 11 is, for example, a white light source that outputs white light and is, for example, a white LED, a lamp light source, a supercontinuum light source, a laser-excited white light source, or the like. The light source 11 may be a light source that outputs light other than white light. The light emitted from the light source 11 is light including a wavelengths to be reflected and scattered by the sample 100, and is selected according to the sample 100. The light source 11 outputs light of a wavelength included in a predetermined wavelength range of the inclined dichroic mirror 22 (to be described later) (wavelength range in which the transmittance and the reflectance of the inclined dichroic mirror 22 change according to the wavelength) provided in the camera system 20. FIG. 5 is a graph describing a relationship between a characteristic of the inclined dichroic mirror 22 and a wavelength of the light emitted from the light source 11. In FIG. 5, the horizontal axis represents the wavelength, and the vertical axis represents the transmittance of the inclined dichroic mirror 22. As illustrated by a characteristic X4 of the inclined dichroic mirror 22 in FIG. 5, in the inclined dichroic mirror 22, the transmittance (and the reflectance) of light gradually changes according to a change in wavelength in a predetermined wavelength range X1, and regardless of a change in wavelength, the transmittance (and the reflectance) of light is constant in a wavelength range other than the specific wavelength range. In other words, the transmittance of light changes in a monotonically increasing manner (the reflectance changes in a monotonically decreasing manner) in a specific wavelength band (wavelength band of wavelength $\lambda_1$ to $\lambda_2$) according to a change in wavelength. As illustrated in FIG. 5, light X2 output from the light source 11 includes light of a wavelength included in the predetermined wavelength range X1 described above. Namely, the light source 11 outputs light of a broad spectrum including the predetermined wavelength range X1.

Returning to FIG. 1, the spectral elements 12 and 13 split the white light output from the light source 11 for each wavelength (split the white light into rainbow colors of light), to output irradiation light including a plurality of the flat light fluxes Li1, Li2, . . . LiX having different wavelengths, in the direction intersecting the optical axis direction. The spectral element 12 receives the white light output from the light source 11 and outputs light toward the spectral element 13. The spectral element 13 receives the light output from the spectral element 12 and outputs the irradiation light that is parallel light, toward the sample 100.

Figure 3:
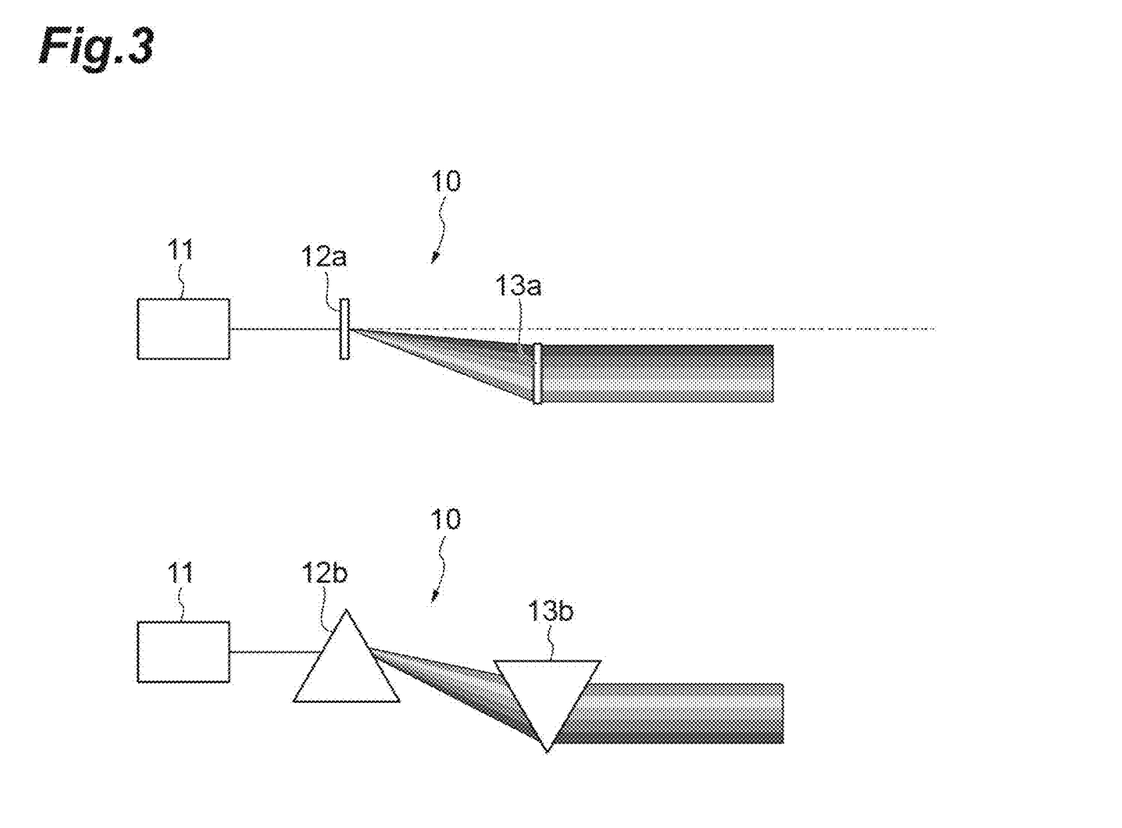
FIG. 3 is a view illustrating a configuration example of a light irradiation unit illustrated in FIG. 1.

FIG. 3 is a view illustrating a configuration example of the light irradiation unit 10. The light irradiation unit 10 illustrated in FIG. 3(a) includes diffraction gratings 12a and 13a as the spectral elements 12 and 13. The diffraction gratings 12a and 13a output a light flux of each wavelength such that the longer the wavelength is, the more easily the light flux is bent. Incidentally, the diffraction grating 13a may be a lens. The light irradiation unit 10 illustrated in FIG. 3(b) includes prisms 12b and 13b as the spectral elements 12 and 13. The prisms 12b and 13b output a light flux of each wavelength such that the shorter the wavelength is, the more easily the light flux is bent, depending on the refractive index for each wavelength. Incidentally, the prism 13b may be a lens. Hereinafter, a description will be given based on a case where the spectral elements 12 and 13 are the diffraction gratings 12a and 13a.

Figure 4:
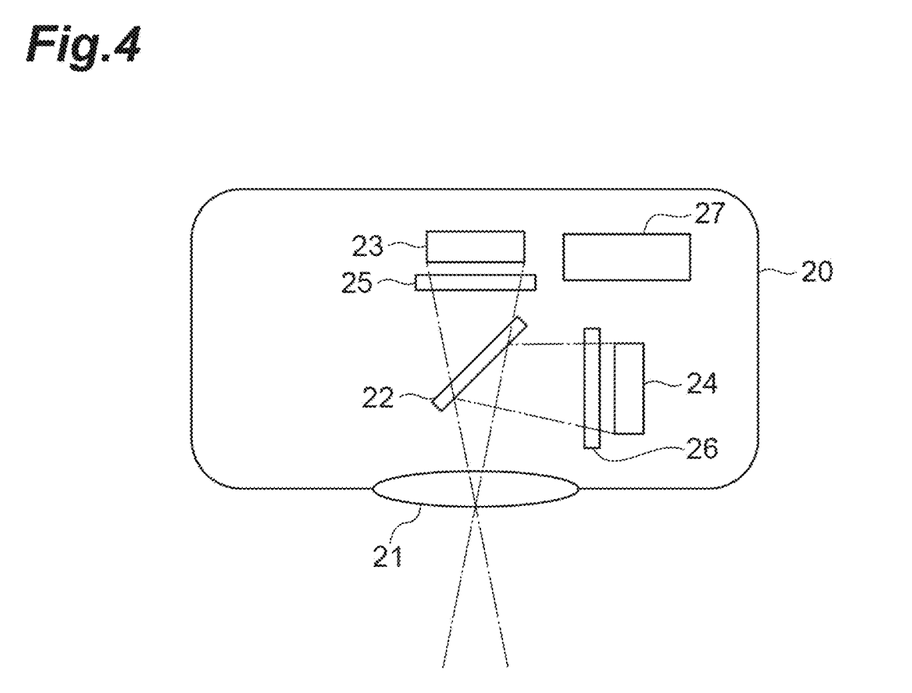
FIG. 4 is a view schematically illustrating a camera system illustrated in FIG. 1.

Returning to FIG. 1, the camera system 20 detects light from the sample 100 irradiated with the irradiation light from the light irradiation unit 10, to output wavelength information of the light. The camera system 20 is disposed at a position where the light from the sample 100 can be detected. FIG. 4 is a view schematically illustrating the camera system 20 illustrated in FIG. 1. As illustrated in FIG. 4, the camera system 20 includes the lens 21, the inclined dichroic mirror 22 (optical element), the light detectors 23 and 24 (a first light detector and a second light detector), bandpass filters 25 and 26, and a processing unit 27.

The lens 21 is a lens that concentrates the incident light from the sample 100. The lens 21 may be disposed in a front stage (upstream) of the inclined dichroic mirror 22 or may be disposed in a region between the inclined dichroic mirror 22 and each of the light detectors 23 and 24. The lens 21 may be a finite focus lens or an infinite focus lens. When the lens 21 is a finite focus lens, the distance from the lens 21 to each of the light detectors 23 and 24 has a predetermined value. When the lens 21 is an infinite focus lens, the lens 21 is a collimator lens that converts the light from the sample 100 into parallel light, and is aberration-corrected to obtain the parallel light. The light output from the lens 21 is incident on the inclined dichroic mirror 22.

The inclined dichroic mirror 22 is a mirror made of a special optical material, and is an optical element that separates the light from the sample 100 by transmitting and reflecting the light according to the wavelength. The inclined dichroic mirror 22 is configured such that the transmittance and the reflectance of light change according to the wavelength in a predetermined wavelength range.

FIG. 5 is a graph describing a spectrum of light and the characteristic of the inclined dichroic mirror 22. In FIG. 5, the horizontal axis represents the wavelength, and the vertical axis represents the spectral intensity (in the case of the spectrum of light) and the transmittance (in the case of the inclined dichroic mirror 22). As illustrated by the characteristic X4 of the inclined dichroic mirror 22 in FIG. 5, in the inclined dichroic mirror 22, the transmittance (and the reflectance) of light gradually changes according to a change in wavelength in a predetermined wavelength range (wavelength range of wavelength $\lambda_1$ to $\lambda_2$), and regardless of a change in wavelength, the transmittance (and the reflectance) of light is constant in a wavelength range (namely, on a wavelength side lower than the wavelength $\lambda_1$ and on a wavelength side higher than the wavelength $\lambda_2$) other than the predetermined wavelength range. Since the transmittance and the reflectance have a negative correlation in which one changes in an increasing direction and the other changes in a decreasing direction, hereinafter, the transmittance and the reflectance may be simply written as the "transmittance" instead of being written as the "transmittance (and the reflectance)". Incidentally, "the transmittance of light is constant regardless of a change in wavelength" includes not only a case where the transmittance of light is completely constant, but also, for example, a case where a change in transmittance for a change of 1 nm in wavelength is 0.1% or less. On the wavelength side lower than the wavelength $\lambda_1$, the transmittance of light is approximately 0% regardless of a change in wavelength, and on the wavelength side higher than the wavelength $\lambda_2$, the transmittance of light is approximately 100% regardless of a change in wavelength. Incidentally, "the transmittance of light is approximately 0%" includes a transmittance of approximately 0%+10%, and "the transmittance of light is approximately 100%" includes a transmittance of approximately 100%−10%.

Returning to FIG. 4, the light detectors 23 and 24 detect the light separated by the inclined dichroic mirror 22. The light detectors 23 and 24 are, for example, one-dimensional line sensors. The light detector 23 detects a transmitted light quantity from light transmitted through the inclined dichroic mirror 22. The light detector 24 detects light reflected by the inclined dichroic mirror 22. The range of a wavelength to which the light detectors 23 and 24 have sensitivity corresponds to the predetermined wavelength range in which the transmittance (and the reflectance) of light in the inclined dichroic mirror 22 changes according to a change in wavelength.

The bandpass filter 25 is disposed between the inclined dichroic mirror 22 and the light detector 23. The bandpass filter 26 is disposed between the inclined dichroic mirror 22 and the light detector 24. The bandpass filters 25 and 26 may be, for example, filters that remove light in a wavelength range other than the predetermined wavelength range described above (wavelength range in which the transmittance and the reflectance of light in the inclined dichroic mirror 22 change according to the wavelength).

The processing unit 27 calculates the wavelength information based on a ratio between the transmitted light quantity detected by the light detector 23 and a reflected light quantity detected by the light detector 24, to output the wavelength information to the control apparatus 30. In the height measurement apparatus 1, light with which one point on the sample 100 moved by the belt conveyor 50 is irradiated is monochromatic. Namely, light with which one point on the sample 100 is irradiated is only light of a light flux in the irradiation light including a plurality of light fluxes having different wavelengths, and is monochromatic. When a wavelength (wavelength that is desired to be derived) of the irradiation light is $\lambda$, the transmitted light quantity is T, and the reflected light quantity is R, a wavelength shift parameter S is expressed by the following Equation (1).

$$S=(T-R)/(T+R) \quad (1)$$

Here, when a wavelength at which the reflectance is 100% is $\lambda_1$ and a wavelength at which the transmittance is 100% is $\lambda_2$ in the inclined dichroic mirror 22, it is clear that a wavelength $\lambda_{50\%}$ for a transmittance of 50% is $(\lambda_1+\lambda_2)/2$, from the characteristic of the inclined dichroic mirror which causes the rate of change to linearly change with respect to the wavelength. At this time, the wavelength shift parameter S is 0. From here, the amount of change when the wavelength is shifted by $\Delta X$ is expressed by the following Equation (2) using the wavelength shift parameter S. In addition, the wavelength $\lambda$ is expressed by the following Equation (3).

$$\Delta\lambda=S(\lambda_2-\lambda_1)/2 \quad (2)$$

$$\lambda=\lambda_{50\%}+\Delta\lambda \quad (3)$$

The processing unit 27 outputs the wavelength (wavelength information) derived using these equations, to the control apparatus 30.

Returning to FIG. 1, the control apparatus 30 is a computer and physically includes memories such as a RANI and a ROM, a processor (arithmetic circuit) such as a CPU, a communication interface, and a storage unit such as a hard disk. The function of the control apparatus 30 is realized by causing the CPU of a computer system to execute a program stored in the memory. The control apparatus 30 may be configured as a microcomputer or an FPGA.

The control apparatus 30 includes the control unit 31, a calculation unit 32, and a display unit 33. The control unit 31 controls each configuration of the height measurement apparatus 1. Specifically, the control unit 31 controls the camera system 20 and controls the actuator 51 of the belt conveyor 50. The control unit 31 controls a line rate of the light detectors 23 and 24 that are, for example, line sensors, inside the camera system 20 by adjusting a conveyance speed of the belt conveyor 50 through controlling the actuator.

The calculation unit 32 calculates a height of the sample 100 (height of one point on the sample 100 with which the irradiation light is irradiated) based on the wavelength information derived by the processing unit 27. The calculation unit 32 calculates a height of the sample 100 based on a pitch D of the diffraction grating, the wavelength $\lambda$, and a distance L between the spectral elements 12 and 13. Here, since the irradiation light is collimated by the spectral elements 12 and 13 that are diffraction gratings, a height h for each wavelength is expressed by the following Equation (4), and a height H of the sample 100 is expressed by the following Equation (5). Incidentally, $\theta$ is an inclination angle of light with respect to the spectral element 13, and φ is an inclination angle of the irradiation light from the horizontal direction.

$$h = L^* \tan \theta = L^* \lambda / \sqrt{(D^2 - \lambda^2)} \quad (4)$$

$$H = h \cos \varphi \quad (5)$$

The calculation unit 32 may derive the shape of sample 100 by calculating a height corresponding to each irradiation point on the sample 100. For example, when the light detectors 23 and 24 are line sensors, since a height is measured for one line, a three-dimensional shape of the sample 100 can be derived by continuously calculating a height of each line. Incidentally, when prisms are used as the spectral elements 12 and 13, since a difference in bending for each wavelength depends on a refractive index of glass, a height cannot be simply calculated, so that a height is calculated not by the above-described equations, but by conversion using a table obtained in advance or by an approximate value from an approximate curve.

The display unit 33 displays information related to the height of the sample 100 calculated by the calculation unit 32. The display unit 33 displays, for example, detection results (imaging results) of the light detectors 23 and 24 and information indicating the height of the sample 100. In addition, the display unit 33 may display the shape (restored shape) of the sample 100 derived from the height corresponding each irradiation point.

Figure 6:
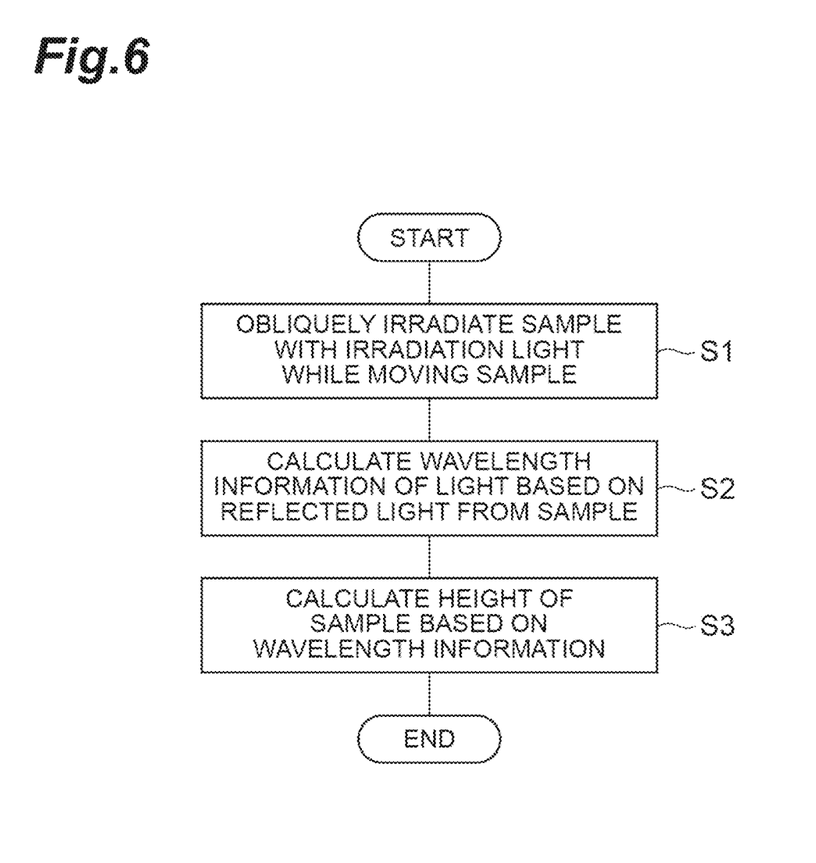
FIG. 6 is a flowchart illustrating a height measurement method according to the present embodiment.

Next, the height measurement method performed by the height measurement apparatus 1 according to the present embodiment will be described with reference to FIG. 6. FIG. 6 is a flowchart illustrating the height measurement method according to the present embodiment.

In the height measurement method according to the present embodiment, as illustrated in FIG. 6, the sample 100 is obliquely irradiated with irradiation light while the sample 100 is moved by the belt conveyor 50 (step S1: light irradiation step). The irradiation light includes a plurality of light fluxes arranged in a direction intersecting an optical axis direction and having different wavelengths.

Subsequently, wavelength information of light is calculated based on reflected light from the sample 100 (step S2: wavelength calculation step). Specifically, wavelength information is calculated based on a ratio between a transmitted light quantity and a reflected light quantity separated by the inclined dichroic mirror 22.

Subsequently, a height of the sample 100 is calculated based on the wavelength information (step S3: height calculation step). In the height calculation step, a shape of the sample 100 may be restored (derived) by calculating a height corresponding to each irradiation point on the sample 100 on which the irradiation point changes when the sample 100 moves. The above is the height measurement method performed by the height measurement apparatus 1.

Next, actions and effects of the height measurement apparatus 1 and the height measurement method according to the present embodiment will be described.

The height measurement apparatus 1 according to the present embodiment includes: the light irradiation unit 10 that irradiates the sample 100 with irradiation light including a plurality of light fluxes arranged in a direction intersecting an optical axis direction and having different wavelengths, at an angle inclined with respect to a height direction of the sample 100; the camera system 20 that detects light from the sample 100 irradiated with the irradiation light, to output wavelength information of the light; and the control apparatus 30 that calculates a height of the sample 100 based on the wavelength information. The camera system 20 includes the inclined dichroic mirror 22 of which a transmittance and a reflectance change according to a wavelength in a predetermined wavelength range and which separates the light from the sample 100 by transmitting and reflecting the light, the light detector 24 that detects a reflected light quantity from light reflected by the inclined dichroic mirror 22, the light detector 23 that detects a transmitted light quantity from light transmitted through the inclined dichroic mirror 22, and the processing unit 27 that calculates the wavelength information based on a ratio between the reflected light quantity and the transmitted light quantity, to output the wavelength information.

In the height measurement apparatus 1 according to the present embodiment, the sample 100 is irradiated with the irradiation light including the plurality of light fluxes arranged in the direction intersecting the optical axis direction and having different wavelengths, at an angle inclined with respect to the height direction of the sample 100, wavelength information is derived based on the light from the sample 100 and is output, and a height of the sample 100 is calculated based on the wavelength information. As described above, since the sample 100 is obliquely (at an inclined angle) irradiated with the irradiation light including the plurality of different light fluxes, in the direction intersecting the optical axis direction, the wavelength of the light with which the sample 100 is irradiated changes depending on the height of the sample 100. Therefore, when the light from the sample 100 is detected and the wavelength information is derived, the height of the sample 100 can be appropriately calculated based on the wavelength information. Here, in the height measurement apparatus 1 according to the present embodiment, the light is separated by the inclined dichroic mirror 22 of which the transmittance and the reflectance change according to the wavelength, the reflected light quantity is detected from the light reflected by the inclined dichroic mirror 22, the transmitted light quantity is detected from the light transmitted through the inclined dichroic mirror 22, and the wavelength information is calculated based on the ratio between the reflected light quantity and the transmitted light quantity. For example, when a wavelength of light from a measurement object is derived based on the intensity of light acquired by a color imaging element, since the intensity of light acquired by the color imaging element changes due to being affected by a color of the measurement object itself, the calculation accuracy of wavelength information of the light cannot be guaranteed, which is a concern. In this case, the height measurement accuracy of the measurement object based on the wavelength information also decreases. In this regard, in the height measurement apparatus 1 according to the present embodiment, as described above, since the light is separated by the inclined dichroic mirror 22 of which the transmittance and the reflectance change according to the wavelength, and the wavelength information is calculated based on the ratio between the reflected light quantity and the transmitted light quantity that are separated, the wavelength information of the light can be calculated with high accuracy without being affected by a color of the sample 100 itself. According to the height measurement apparatus 1, the height of the sample 100 can be calculated with high accuracy based on the wavelength information of the light calculated with high accuracy. The calculation accuracy can be improved, for example, by correcting distortion of characteristics of a filter or the transmittance or the like of a lens, and for example, when the "predetermined wavelength range" of the inclined dichroic mirror 22 (wavelength range in which the transmittance and the reflectance change according to the wavelength) is designed to be 400 nm to 700 nm, the error can be approximately 1 nm.

In the height measurement apparatus 1, the light detectors 23 and 24 may be line sensors. Since the line sensors are used, for example, imaging is performed on each imaging line with high accuracy while changing the imaging line by moving the sample 100. Accordingly, the height of the sample 100 can be calculated with higher accuracy.

In the height measurement apparatus 1, the light irradiation unit 10 may irradiate the sample 100 with the irradiation light including the plurality of light fluxes that are parallel light. Since the sample 100 is irradiated with parallel light, a correspondence between the wavelength and the height can be easily and appropriately derived, and the height of the sample 100 can be calculated with higher accuracy.

In the height measurement apparatus 1, the light irradiation unit 10 may include a light source 11 that emits white light, and spectral elements 12 and 13 that split the white light output from the light source 11, to output the irradiation light including the plurality of light fluxes having different wavelengths, in the direction intersecting the optical axis direction. As described above, the irradiation light including the plurality of light fluxes having different wavelengths can be easily and appropriately output by splitting the white light including all visible rays and by outputting each light flux.

The height measurement apparatus 1 further includes a dark box 40 that blocks light other than the light with which the sample 100 is irradiated by the light irradiation unit 10, as light with which the sample 100 is to be irradiated. According to such a configuration, the height of the sample 100 can be calculated with higher accuracy by blocking the light that is not related to the height measurement.

The height measurement apparatus 1 may further include a belt conveyor 50 that moves the sample 100. According to such a configuration, the height of the entire sample 100 can be measured by deriving wavelength information of the entire sample 100 while changing an irradiation point of the irradiation light on the sample 100.

The height measurement method according to the present embodiment includes: a light irradiation step of irradiating the sample 100 with irradiation light including a plurality of light fluxes arranged in a direction intersecting an optical axis direction and having different wavelengths, at an angle inclined with respect to a height direction of the sample 100; a wavelength calculation step of calculating wavelength information of light from the sample 100 based on a ratio between a reflected light quantity and a transmitted light quantity obtained by the light detector 24 that detects the reflected light quantity from light reflected by the inclined dichroic mirror 22 of which a transmittance and a reflectance change according to a wavelength in a predetermined wavelength range and which separates the light from the sample 100 by transmitting and reflecting the light, and by the light detector 23 that detects the transmitted light quantity from light transmitted through the inclined dichroic mirror 22; and a height calculation step of calculating a height of the sample 100 based on the wavelength information. According to such a height measurement method, the height of the sample 100 can be calculated with high accuracy based on the wavelength information of the light calculated with high accuracy.

In the height measurement method, in the light irradiation step, an irradiation point of the irradiation light on the sample 100 may be continuously changed by moving the sample 100, and in the height calculation step, a shape of the sample 100 may be derived by calculating a height corresponding to the each irradiation point on the sample 100. In such a height measurement method, the irradiation point of the irradiation light on the sample 100 is continuously changed to measure the height of the entire sample 100, and the shape of the sample 100 can be appropriately derived based on a result of the height measurement.

Incidentally, as other techniques of measuring a shape (unevenness) of a measurement object, there are a method using structured light, a method using a time of flight (TOF) sensor, and the like. In the method using structured light, a shape of a measurement object is measured by irradiating the measurement object with linear light and observing the measurement object in an oblique direction with a camera. However, since this method must require a two-dimensional sensor, the measurement speed is slow and the processing load is high compared to a case where a one-dimensional sensor such as a line sensor is used. In addition, in the method using a TOF sensor, pulsed light is applied to a measurement object, and the unevenness of the measurement object is measured from the timing at which the pulsed light is output and from the time taken for the pulsed light to bounce back from the measurement object. However, in this method, it is difficult to enlarge pixels due to the characteristic of measuring a very short time, and this method is not suitable for observing a fine shape. In this regard, in the shape measurement method performed by the height measurement apparatus 1 according to the present embodiment, the measurement speed can be increased, the processing load can be reduced, and a fine shape can also be appropriately measured compared to the comparative examples.

REFERENCE SIGNS LIST

1: height measurement apparatus, 10: light irradiation unit, 11: light source, 12, 13: spectral element, 20: camera system (light detection unit), 22: inclined dichroic mirror (optical element), 23, 24: light detector (first light detector, second light detector), 25, 26: bandpass filter, 27: processing unit, 30: control apparatus (analysis unit), 40: dark box, 50: belt conveyor (conveyor unit), 100: sample (measurement object).

The invention claimed is:

1. A height measurement apparatus comprising:
a light irradiator configured to irradiate a measurement object with irradiation light comprising a plurality of light fluxes arranged in a direction intersecting an optical axis direction and having different wavelengths, at an angle inclined with respect to a height direction of the measurement object;
a light detector configured to detect light from the measurement object irradiated with the irradiation light, and output wavelength information of the light; and
an analyzer configured to calculate a height of the measurement object based on the wavelength information,
wherein the light detector comprises an optical filter of which a transmittance and a reflectance monotonically change according to a wavelength in a predetermined wavelength range and which separates the light from the object by transmitting and reflecting the light, a first light detector configured to detect a reflected light quantity from light reflected by the optical filter, a first bandpass filter disposed between the optical filter and the first light detector configured to remove light in a wavelength range other than the predetermined wavelength range, a second light detector configured to detect a transmitted light quantity from light transmitted through the optical filter, a second bandpass filter disposed between the optical filter and the second light detector configured to remove light in a wavelength range other than the predetermined wavelength range, and a processor configured to calculate the wavelength information based on a ratio between the reflected light quantity and the transmitted light quantity, and output the wavelength information, and the light from the measurement object has a spectral luminance peak in the predetermined wavelength range of the optical filter.

2. The height measurement apparatus according to claim 1, wherein the first light detector and the second light detector are line sensors.

3. The height measurement apparatus according to claim 1, wherein the light irradiator irradiates the measurement object with the irradiation light comprising the plurality of light fluxes that are parallel light.

4. The height measurement apparatus according to claim 1, wherein the light irradiator comprises a light source configured to emit white light, and a spectral element configured to split the white light output from the light source, to output the irradiation light comprising the plurality of light fluxes having different wavelengths, in the direction intersecting the optical axis direction.

5. The height measurement apparatus according to claim 1, further comprising:

a dark box configured to block light other than the light with which the measurement object is irradiated by the light irradiator, as light with which the measurement object is to be irradiated.

6. The height measurement apparatus according to claim 1, further comprising:

a conveyor configured to move the measurement object.

7. A height measurement method comprising:

irradiating a measurement object with irradiation light comprising a plurality of light fluxes arranged in a direction intersecting an optical axis direction and having different wavelengths, at an angle inclined with respect to a height direction of the measurement object;

calculating wavelength information of light from the measurement object based on a ratio between a reflected light quantity and a transmitted light quantity obtained by an optical filter of which a transmittance and a reflectance monotonically change according to a wavelength in a predetermined wavelength range and which separates the light from the object by transmitting and reflecting the light, by a first light detector configured to detect the reflected light quantity from light reflected by the optical filter, a first bandpass filter disposed between the optical filter and the first light detector configured to remove light in a wavelength range other than the predetermined wavelength range, a second light detector configured to detect the transmitted light quantity from light transmitted through the optical filter, and a second bandpass filter disposed between the optical filter and the second light detector configured to remove light in a wavelength range other than the predetermined wavelength range; and calculating a height of the measurement object based on the wavelength information, wherein the light from the measurement object has a spectral luminance peak in the predetermined wavelength range of the optical filter.

8. The height measurement method according to claim 7, wherein in the light irradiation step, an irradiation point of the irradiation light on the measurement object is continuously changed by moving the measurement object, and in the height calculation step, a shape of the measurement object is derived by calculating a height corresponding to the each irradiation point on the measurement object.

* * * * *